D. CARMICHAEL.
ACETYLENE GAS LIGHTING PLANT.
APPLICATION FILED DEC. 26, 1919.

1,422,030.

Patented July 4, 1922.

Witnesses:

Inventor
Duncan Carmichael
by James L. Norris,
Attorney.

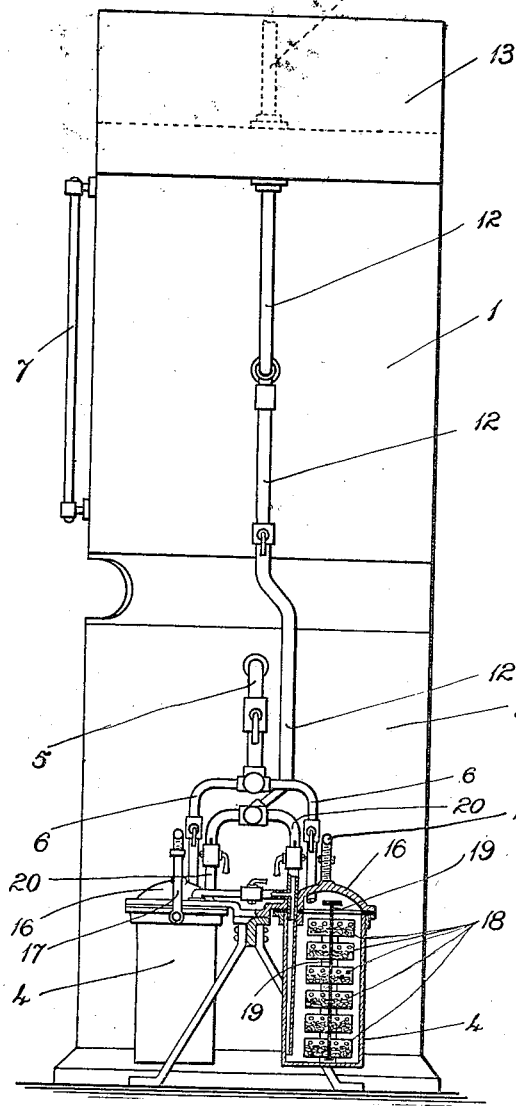

UNITED STATES PATENT OFFICE.

DUNCAN CARMICHAEL, OF ANCOATS, MANCHESTER, ENGLAND.

ACETYLENE-GAS-LIGHTING PLANT.

1,422,030.  Specification of Letters Patent.  Patented July 4, 1922.

Application filed December 26, 1919. Serial No. 347,392.

*To all whom it may concern:*

Be it known that DUNCAN CARMICHAEL, a subject of the King of Great Britain, residing at Ancoats, Manchester, England, has invented certain new and useful Improvements in Acetylene-Gas-Lighting Plants, of which the following is a specification.

This invention relates to improvements in that class of acetylene gas lighting plants in which two tanks are placed one above the other, and wherein the lower tank is filled with water up to a convenient height, and is connected to the upper tank by means of a pipe which does not reach the bottom of the lower tank, thus permitting the water in the lower tank to be forced into the upper tank by the pressure of the gas generated and delivered to the upper portion of the lower tank.

The invention relates also to means for regulating the water supply to the generators, so as to prevent a flooding of the main tanks should the generators be flooded, such means consisting of a regulating valve operated by a ball float in a tank arranged in the supply pipes between the cistern and the generators.

In order that my invention may be thoroughly understood, I will now describe it with reference to the drawings hereunto annexed.

Figure 2 is a side elevation of the same showing a section of a suitable generator.

Figure 1:
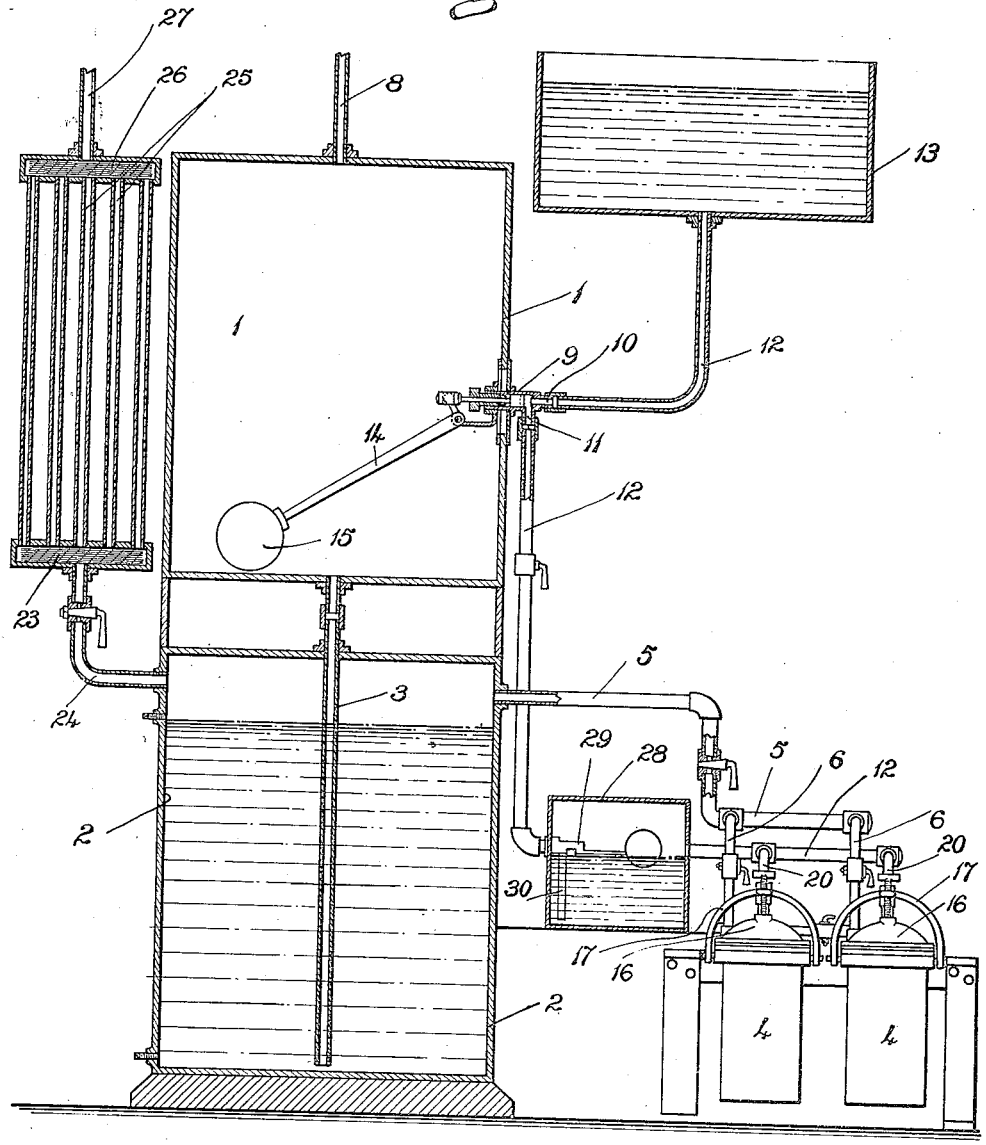
Figure 1 is a front elevation of an acetylene gas lighting plant showing the main tanks in section, water tank and regulating valve also in section.

In the apparatus employed one tank 1 is placed above another tank 2 and connected to the latter by a pipe 3. The lower tank 2 is filled with water to a convenient height, and the pipe 3 terminates about one inch from the bottom of the lower tank 2 to permit the water in the lower tank 2 to be forced into the upper tank 1 by the pressure of the gas delivered from the generator or generators to the upper portion of the lower tank.

The lower tank 2 is connected to the generators 4, by means of a gas pipe 5 and branch pipes 6, through which the gas, when generated, passes from the generators into the upper portion of the lower tank 2.

The gas pressure forces the water contained in the lower tank 2 through the pipe 3 into the upper tank 1 which is provided with a water gauge glass tube 7, a valve, and a pipe 8 open to the atmosphere to permit the escape of air from said tank as water rises therein and to permit the ingress of air to said tank when water flows therefrom.

The regulating valve preferably consists of a cylinder 9 having two branches 10 and 11 to which the water supply pipe 12 is connected.

The valve proper, which is of the piston type, is positioned in the cylinder and has a packing at its free end which acts against a seating within the tubular branch 10 at the inlet end of the latter to control the supply of water through the pipe 12 from the cistern 13, the stem of the piston valve passing through a stuffing box positioned in a hollow extension at the opposite end of the branch 10. The free end of the piston stem is engaged by one arm of a bell-crank lever 14. The other arm of the lever 14 carries a ball float 15 which is positioned in the tank 1.

The gas is generated in the generators 4 and these have fixed lids 16, each held by means of a clamp 17 to permit of rapid dismantling for cleaning and recharging. Inside the generators are positioned separate perforated zinc trays 18 mounted on a metal stem 19, which has a handle for lifting the trays 18 to and from the generators 4. The water is conveyed to the generators 4 through the supply pipe 12 from a suitable cistern 13 and through branch pipes 20 to the bottom of the generators 4. The water rises in the generators and attacks the first of the zinc trays 18 which contain the calcium carbide. The gas then begins to generate and passes through the pipes 6 and 5 into the upper portion of the lower tank 2. The water in the lower tank 2 is forced by the gas pressure into the upper tank 1 through the connecting pipe 3. When the water rises in the upper tank 1, it comes in contact with and gradually raises the ball float 15, which, in its turn, through the medium of the cranked lever 14 moves the valve against its seat. The valve piston being fitted with a pad forms a water tight joint when it comes in contact with the seating in the branch 10, and thus gradually shuts off the water supply from the cistern 13 to the generators 4. The gas passes from the lower tank 2 through the pipe 24, to a purifier 23, thence through the coolers 25, thence to the purifier 26, and thence through the pipe 27 to the burners. As the gas is consumed, the pressure in the upper portion of the tank 2 is reduced, thus permitting water in the upper tank 1 to flow back into the lower tank 2. As the water falls in the tank 1 the ball 15 drops and, through the bell-crank lever 14, permits a flow of water from the cistern 13 through the pipe 12 to the generators 4 so as to create a regeneration of gas in the generators. The gas in this way is kept at a constant pressure by the water supply to the generators being gradually shut off and gradually released. Suitable stop cocks or the like are fitted to the gas and water pipes as shown.

To automatically cut off the water supply to the generators should the generators 4 be neglected and allowed to become flooded I interpose in the supply pipe 12 between the cistern 13 and generators 4 a closed gas tight tank 28, and to the inlet of said tank 28 I connect a ball regulating valve 29 having an extension pipe 30 depending from its delivery end to near the bottom of the tank 28 and I arrange the outlet from the tank 28 to the generators at substantially the same level as the inlet.

The ball valve 29 is adjusted to maintain such a level in the tank 28 that sufficient water may pass to the generators 4, but should the generators be neglected and allowed to flood, the level of the water in the tank 28 will rise and the ball valve will shut off the further supply of water to the tank 28 and generators 4, so as to prevent water from rising in the system high enough to pass through the pipe 5 to the main tank 2. Should gas be quickly generated in newly charged generators the ball valve will prevent the gas passing into feed pipe 12 and tank 1, the gas being checked by the water and extension feed pipe 30 on the ball valve.

What I do claim as my invention and desire to secure by Letters Patent, is:—

1. An acetylene gas plant, comprising a generator, a tank adapted to contain water, means for delivering gas from the generator to said tank above the water contained therein, a second tank connected to the lower portion of said first tank to receive water expelled from the first tank by gas pressure from the generator, a water supply pipe, a valve in said pipe, a sealed tank to receive water from said water supply pipe, a connection between said sealed tank and said generator and through which water passes to said generator, float-controlled means in said second tank for closing the valve in said water supply pipe when the water delivered to said second tank by the pressure of gas in the first tank reaches a predetermined level, and float-operated means in said sealed tank to govern the supply of water to said sealed tank and from said sealed tank to the generator and operative to prevent the flow of water through the generator to said first-named tank and prevent back pressure of gas from the generator to the water supply means.

2. An acetylene gas plant, comprising a generator, a tank adapted to contain water, means for delivering gas from the generator to said tank above the water contained therein, a second tank connected to the lower portion of said first tank to receive water expelled from the first tank by gas pressure from the generator, a water supply pipe, a valve in said pipe, a sealed tank to the lower portion of which water is delivered by said water supply pipe, a pipe connecting the upper portion of said sealed tank with said generator, means in said second tank controlled by the level of water in said second tank for closing the valve in the water supply pipe when the water delivered to said second tank by pressure of gas in the first tank reaches a predetermined level, and a valve in said sealed tank operative to shut off the supply of water to said sealed tank when the water in said tank rises above a predetermined level, said valve also being operative to prevent the flow of water through the generator to said first-named tank and to prevent back pressure of gas from the generator to the water supply pipe.

In testimony whereof I have hereunto set my hand in presence of two subscribing witnesses.

DUNCAN CARMICHAEL.

Witnesses:
 ERNALD SIMPSON MOSELEY,
 WILLIAMSON DOLEMAN.